(12) United States Patent
Baehrle-Miller et al.

(10) Patent No.: US 9,701,290 B2
(45) Date of Patent: Jul. 11, 2017

(54) METHOD AND APPARATUS FOR OPERATING A BRAKING DEVICE, BRAKING DEVICE

(71) Applicant: Robert Bosch GmbH, Stuttgart (DE)

(72) Inventors: Frank Baehrle-Miller, Schoenaich (DE); Dieter Blattert, Kirchheim/Neckar (DE); Helmut Wolff, Heilbronn (DE); Simon Hauber, Freiberg am Neckar (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/975,806

(22) Filed: Dec. 20, 2015

(65) Prior Publication Data

US 2016/0176388 A1    Jun. 23, 2016

(30) Foreign Application Priority Data

Dec. 22, 2014    (DE) .................. 10 2014 226 857

(51) Int. Cl.
| | | |
|---|---|---|
| *B60T 8/17* | (2006.01) | |
| *B60T 13/74* | (2006.01) | |
| *F16D 55/22* | (2006.01) | |
| *F16D 65/18* | (2006.01) | |
| *B60T 8/172* | (2006.01) | |
| *B60T 8/171* | (2006.01) | |
| *F16D 55/226* | (2006.01) | |
| *F16D 121/04* | (2012.01) | |
| *F16D 121/24* | (2012.01) | |
| *F16D 125/40* | (2012.01) | |

(52) U.S. Cl.
CPC .............. *B60T 8/172* (2013.01); *B60T 8/171* (2013.01); *B60T 13/741* (2013.01); *F16D 55/226* (2013.01); *F16D 65/183* (2013.01); *F16D 2121/04* (2013.01); *F16D 2121/24* (2013.01); *F16D 2125/40* (2013.01)

(58) Field of Classification Search
CPC ........ B60T 8/171; B60T 8/172; B60T 13/741; F16D 55/226; F16D 65/183; F16D 2121/04; F16D 2121/24; F16D 2125/40
See application file for complete search history.

(56) References Cited

FOREIGN PATENT DOCUMENTS

JP    2009226964 A  * 10/2009

* cited by examiner

*Primary Examiner* — Aaron L Troost
(74) *Attorney, Agent, or Firm* — Maginot, Moore & Beck LLP

(57) ABSTRACT

A method is used for operating a braking device of a vehicle, in particular a parking brake device. The braking device comprises an electromotive actuator that displaces an actuator element either into a clamping position for subjecting a brake disk to a clamping force or into a release position for releasing the brake disk. A brake disk temperature is determined in order to activate the actuator depending on the determined brake disk temperature. The brake disk temperature is determined depending on at least one actuator current value.

13 Claims, 5 Drawing Sheets

METHOD AND APPARATUS FOR OPERATING A BRAKING DEVICE, BRAKING DEVICE

This application claims priority under 35 U.S.C. §119 to patent application number DE 10 2014 226 857.5, filed on Dec. 22, 2014 in Germany, the disclosure of which is incorporated herein by reference in its entirety.

BACKGROUND

The disclosure concerns a method for operating a braking device of a vehicle, in particular a parking brake device, wherein the braking device comprises an electromotive actuator that displaces an actuator element either into a clamping position for subjecting a brake disk to a clamping force or into a release position for releasing the brake disk, wherein a brake disk temperature is determined in order to activate the actuator depending on the determined brake disk temperature.

The disclosure further concerns an apparatus for performing the method as well as a braking device with such an apparatus.

A method, apparatuses and braking devices of the aforementioned type are known from the prior art. Automatic parking brake systems, in particular of the "motor-on-caliper" type, are generally used on rear wheel brakes of motor vehicles in order to lock the wheels of the rear wheel axle when the vehicle is stationary. For this purpose an electromotive actuator is provided that drives or displaces an actuator element in order to subject a brake disk to a clamping force in a clamping position of the actuator element and to release the brake disk in a release position of the actuator element. Present-day braking devices have the disadvantage that a loss of clamping force can occur if the braking device cools after the time of parking. Here the loss of clamping force is higher, the higher is the temperature difference between the time of parking and a cooled final state. A brake disk temperature model that determines the temperature of the brake disk during driving operation is increasingly available for braking devices, and as a result activates the electromotive actuator depending on the determined brake disk temperature so as to be able to adjust a clamping force that takes into account the loss of clamping force. Present-day brake disk temperature models are however relatively inaccurate, because they are also influenced by many environmental variables, such as temperature, weather, rim material and shape, wheel covering, wheel size, attachments and similar. In order to increase the accuracy, nowadays the temporal behavior of the wheel pressures and the speed are essentially taken into account.

SUMMARY

The method according to the disclosure with the features of one embodiment has the advantage that the number of the subsequent clamping processes following a first clamping of the wheel brake device is reduced to a minimum, a component loading is reduced and the power consumption is also reduced. The effect of a possible incorrect estimate by the brake disk temperature model is reduced by the method according to the disclosure, so that the accuracy of the brake disk temperature measurement is increased. According to the disclosure, it is provided for this purpose that the brake disk temperature is determined depending on a current value of the actuator. During the operation of the electronic actuator, an electric current is detected and is taken into account during the determination of the brake disk temperature. In particular, the motor current of the actuator is dependent on the operating temperature of the actuator as well as the clamping force produced, which is given by the brake disk temperature. By taking the current value into account, the accuracy of the brake disk temperature determination can thus be increased and improved control of the actuator is carried out as a result.

According to an advantageous development of the disclosure, it is provided that a motor current of the actuator is detected during displacement of the actuator element into the clamping position, and that the detected value of the motor current at the point in time of the displacement ending is stored as the current value. At the point in time of the displacement ending, when the actuator element has thus reached its end position and the target clamping force has been adjusted, a current value exists that also depends directly on the brake disk temperature. Here it is assumed that the clamping force is proportional to the delivered motor torque of the actuator and hence also to the motor current.

According to an advantageous development of the disclosure, it is furthermore provided that if the wheel brake device also comprises a hydraulic or pneumatic actuator, a detected pressure value of the hydraulic/pneumatic actuator at the point in time (of the ending) is converted into in an equivalent current, wherein the equivalent current is added to the stored motor current, wherein the sum of the stored motor current and the equivalent current gives the current value. Here it is thus taken into account that for a combined parking brake device, which comprises both an electromotive parking brake and also a hydraulically or pneumatically operated retarding brake, the brake pressure acting on the brake disk by means of the hydraulic and/or pneumatic actuator is also taken into account, in particular when the clamping process is ending. It is hereby guaranteed that a pneumatic or hydraulic loss of clamping force during activation of the electromotive actuator is also taken into account.

It is further preferably provided that a subsequent loss of brake force is concluded depending on the current value. It is also provided that a subsequent loss of clamping force will be determined starting from an actual current value. During this it is preferably assumed therefrom that the temperature profile of the brake disk approximately follows an e-function up to the ambient temperature. The clamping force profile behaves analogously to the temperature profile and in particular comprises the same time constant. If the brake disk temperature is thus determined or verified by determining the current value, then the difference from the normal temperature or ambient temperature is determined depending on the current detected brake disk temperature, and consequently the possible subsequent loss of clamping force that occurs during cooling of the braking device is determined and is taken into account during activation as a result.

It is further preferably provided that the determined brake disk temperature is compared with a threshold value, and that a re-clamping of the wheel brake device is initiated on the determined temperature exceeding the threshold value. For this the threshold value is preferably selected such that if a brake disk temperature above the threshold value is detected, it must be assumed therefrom that the subsequent loss of clamping force during cooling of the brake disk results in such a reduced clamping force that safe locking of the brake disk is no longer guaranteed. In this respect the threshold is selected to be low, such that retightening or subsequent further clamping of the wheel brake device is dispensed with only if the determined brake disk temperature lies below the threshold. As a result of the retightening on exceeding the threshold value it is guaranteed that a possible subsequent loss of clamping force is compensated by an increased clamping force or by a further displacement of the actuator element.

According to an advantageous development of the disclosure, it is provided that the re-clamping is carried out until a clamping force is reached that also exceeds the threshold value in the event of a subsequent loss of clamping force. As a result of this it is guaranteed that overall a clamping force is set that takes into account a possible loss of clamping force so that even with a cooled brake disk a sufficiently safe clamping force is available for locking the brake disk.

Furthermore, it is preferably provided that the current value is determined in an idling phase of the actuator during displacement of the actuator element. For this the current value can be determined in the idling phase both during clamping and also during release of the actuator element or the wheel brake device. The current during the idling phase is in general constant and is determined by the idling friction of the actuator. Mechanical component properties of the actuator are the cause of said phenomenon here. The temperature dependency of the idling current occurs particularly noticeably for braking devices comprising a belt drive made of an elastomer. It is however also possible to detect said dependency with alternative transmissions.

It is particularly preferably provided that a temperature is determined depending on the current value in the idling phase and a reference current value in the idling phase and is used to determine or verify the brake disk temperature. In particular, it is provided that the idling current at room temperature and a current idling current at operating temperature are determined in order to determine the temperature. For this purpose, in particular a proportionality factor is taken into account, which in particular is determined using empirical measurements on a plurality of wheel brake devices. The idling current at room temperature is preferably individually determined for each wheel brake device. The determined temperature is provided to the brake disk temperature model and a clamping force algorithm (force estimator) in order to verify the brake disk temperature and to set an advantageous clamping force.

The apparatus according to the disclosure with the features of one embodiment is characterized by a control unit that performs the method according to the disclosure when used as intended. The aforementioned advantages are achieved by this.

The brake system according to the disclosure with the features of one embodiment is characterized by the control unit according to the disclosure. The aforementioned advantages are achieved by this. Further features and advantages arise from the matters already described above as well as from the following description.

BRIEF DESCRIPTION OF THE DRAWINGS

The disclosure will be described in detail below using the figures. In the figures.

DETAILED DESCRIPTION

Figure 1:
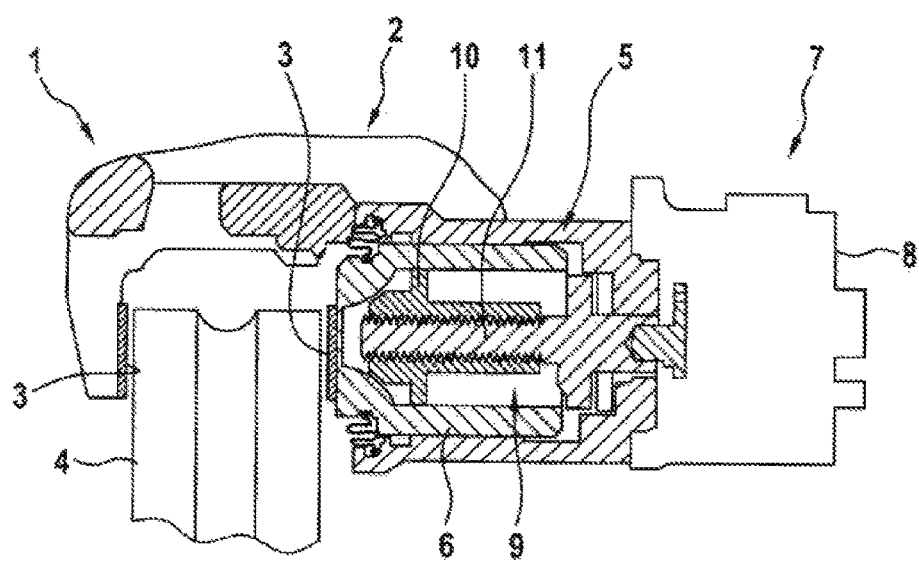
FIG. 1 shows a braking device of a motor vehicle with an integrated parking brake function in a simplified sectional representation.

FIG. 1 shows a wheel brake device 1 of a motor vehicle, which is not shown here in detail, in a simplified sectional representation. The wheel brake device 1 is in the form of a disk brake and comprises for this a brake caliper 2 supporting brake linings 3, between which a brake disk 4 that is rotationally fixedly joined to a wheel of the motor vehicle can be secured or clamped. A hydraulic actuator 5 is associated with the brake caliper 2 for this, comprising a brake piston 6 that is operated hydraulically in order to clamp the brake disk 4 between the brake linings 3 when required. As a result of this, during driving operation a braking torque that is used to decelerate the vehicle is applied to the brake disk 4 and hence to the wheels.

The wheel brake device 1 is furthermore in the form of a parking brake device and comprises for this purpose an electromotive actuator 7 that is formed of an electric motor 8, an actuator gearbox 9, which in the present case is in the form of a spindle gear, and an actuator element 10. An output shaft of the electric motor 8 is rotationally fixedly joined to a drive spindle 11 of the actuator gearbox 9. The drive spindle 11 comprises an external thread that works in conjunction with an internal thread of the actuator element 10 that can be driven along the drive spindle 11. By activating the electric motor 8, the drive spindle 11 is thus set into a rotational motion in order to displace the actuator element 10 translationally. During this the actuator element 10 can be displaced from a release position into a clamping position, in which the actuator element 10 forces the brake piston 6 against the brake disk 4 and clamps the brake caliper 2 as a result. The actuator element 10 is disposed coaxially with respect to the brake piston 6 and within the brake piston 6 for this purpose. Conversion of the rotational displacement of the drive spindle 11 into a translational displacement of the actuator element 10 is performed by means of the actuator gearbox 9.

When clamping the braking device 1, motor parameters, such as for example the motor constant and electrical resistance, are first determined, in particular estimated. The electric motor 8 torque that is required to operate the electric motor 8 at idling speed is then determined by means of the idling current. Said frictional torque must be subtracted from the output torque during the build-up of force in order to obtain the actual effective output torque for providing the clamping force. If the clamping force that is provided is large enough such that the brake disk 4 is locked between the brake linings 3, then the activation is switched off.

The temperature of the brake disk 4 is determined or estimated by a brake disk temperature model. The performance of the temperature estimation is in particular carried out by a control unit of the braking device 1.

Figure 2:
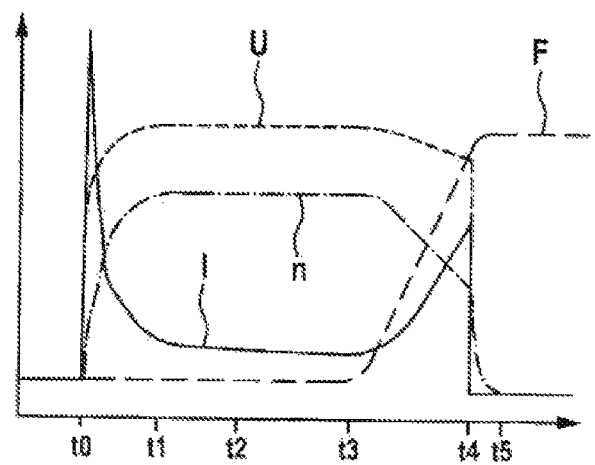
FIG. 2 shows a signal profile during clamping of the braking device, FIGS. 3A and B show a temperature profile and a clamping force profile of the braking device

FIG. 2 shows a signal profile against time t during clamping of the braking device 1. For this purpose the motor input voltage $U_{Mot}$, the motor current $I_{Mot}$, the revolution rate n of the motor as well as the clamping force F that is produced are shown. The activation process is started at a point in time t0. This initially results in a switch-on peak in the motor current I and the revolution rate n as well as in the voltage $U_{Mot}$ rising. From a point in time t1 to t3, the electric motor 8 is in an idling phase, before the clamping force F rises at the point in time t3 and the revolution rate n and the voltage $U_{Mot}$ are reduced, whilst the current $I_{Mot}$ also rises up to the point in time t4, at which the activation process 8 is ended. During this the activation process is in particular ended when a target clamping force Fz is reached.

If the required clamping force F is provided by the actuator 7 during clamping or locking of the braking device 2, the clamping process is ended by stopping the activation. In simple terms, it can be assumed that the clamping force F is proportional to the delivered motor torque $M_{Mot}$ of the electric motor 8 and hence to the current $F_{Mot}$:

$$F_{Clamp} \sim M_{Mot} \sim k_{mot} * I_{Mot} \qquad (1)$$

Figure 3A:
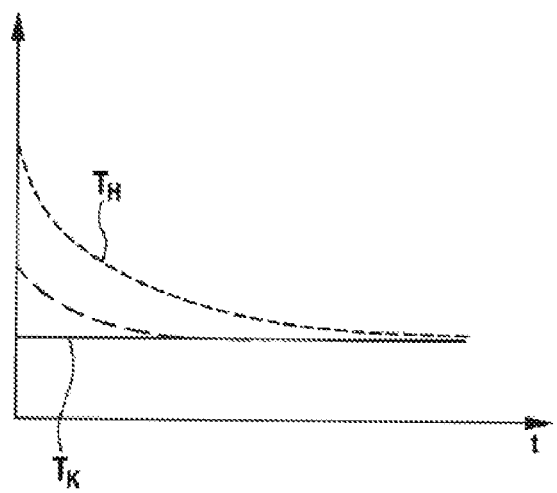
Figure 3B:
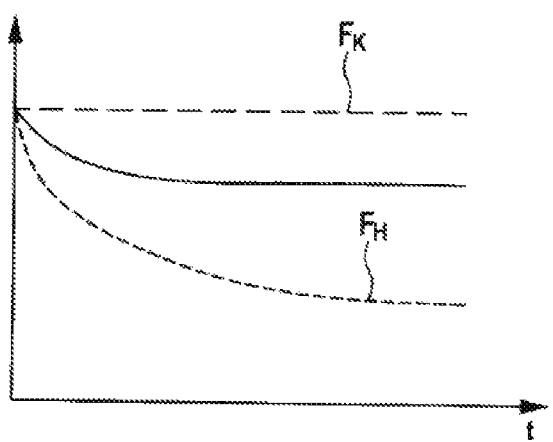

If the wheel brake device 1 is heated, the brake disk temperature T against time t behaves as shown in FIG. 3A by way of example. Here FIG. 3A shows a temperature profile for a hot brake $T_H$ as well as for a cold brake $T_K$ against time t. The temperature profile or the cooling behavior of the brake disk 4 approximately follows an e-function up to ambient temperature. The resulting clamping force profile behaves analogously to the temperature profile during this and comprises the same time constant, as shown in FIG. 3B, which shows the clamping force profile for a hot braking device $F_H$ and for a cold braking device $F_K$ against time t. The following equations apply for this:

$$F_{Clamp}(t) = (F_{initial} - F_{Rest})e^{-1/\tau} + F_{rest} \qquad (2)$$

$$T(t) = (T_{initial} - T_{Ambient})e^{-1/\tau} + T_{Ambient} \qquad (3)$$

Here $F_{Clamp}$ stands for the clamping force, $F_{Initial}$ for the brake clamping force existing immediately after the clamping process, $F_{Rest}$ for a loss of clamping force, T for the brake disk temperature, $T_{Initial}$ for the temperature existing at the point in time of the clamping and $T_{Ambient}$ for the ambient temperature. If the wheel brake device 1 is cold at the point in time of the clamping process, then the clamping force F remains almost at its initial level. In the present case, up to approx. 100° C. a cold wheel brake device is assumed. It is also assumed below that the temperature T is proportional to the clamping force F and hence the relationship of equation (1) can be extended as follows:

$$T_{Mot} \sim F_{Clamp} \sim M_{Mot} \sim k_{Mot} * I_{Mot} \qquad (4)$$

The initial current $I_{Initial}$ at the point in time of the switch-off (t4) that is required to achieve the clamping force is stored during initial clamping. If at the point in time of the clamping at the time t4 there is a known pressure in the hydraulic system of the wheel brake device 1, then the same can be used and converted into an equivalent current that is added to the initial current $I_{Initial}$ existing at the point in time $t_4$. The following applies to this:

The clamping force $F_{Clamp}$ produced by the electromotive actuator is given by:

$$F_{Clamp} = k_{Mot} * I_{Mot} * r_1 \qquad (5)$$

The clamping force Fp produced by the hydraulic pressure is given by:

$$F_p = p * A_{Brake\ piston} * r_2 \qquad (6)$$

Equating equations (5) and (6) and replacing $I_{Mot}$ by $I_p$ gives:

$$k_{Mot} * I_p * r_1 = p * A_{Brake\ piston} * r_2 \qquad (7)$$

$$I_p = (p * A_{Brake\ piston} * r_2)/(k_{Mot} * r_1) \qquad (8)$$

This gives as the corrected initial current $I_{Initial}$:

$$I_{Initial} = I_{t4} + I_p \qquad (9)$$

Equation (4) is thus:

$$T_{Mot} \sim k_{Mot} * I_{Initial} \qquad (10)$$

Here r1, r2 stand for the transmission ratio, or the efficiency of the hydraulic actuator, $A_{Brake\ piston}$ for the brake piston area, $k_{Mot}$ for the motor constant, p for the effective pressure acting on the brake piston at the switch-off time point, and $I_p$ for the current equivalent to the effective pressure. As a result of the motor temperature $T_{Mot}$ being proportional to the current, the current $I_{Initial}$ now represents the initial temperature $T_{Initial}$.

Figure 4:
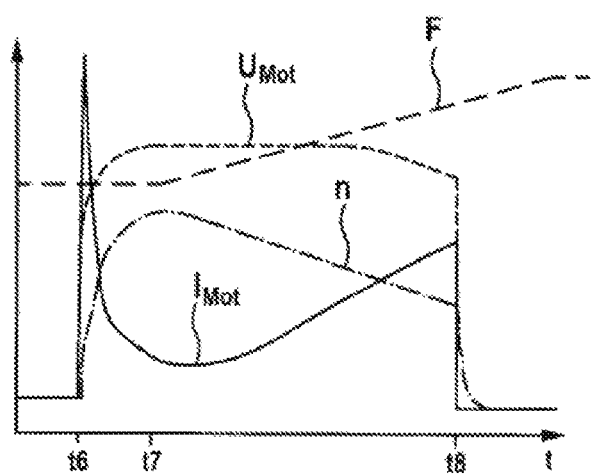
FIG. 4 shows a signal profile during re-clamping of the braking device.

FIG. 4 shows the signal profile of the electromotive actuator 7 for a re-clamping process of the wheel brake device 1. The voltage $U_{Mot}$, the current $I_{Mot}$, the revolution rate n as well as the clamping force F are again plotted against time t for this. The re-clamping process is started at a point in time t6. The result of this is that the existing clamping force does not fall below the target clamping force, even following further cooling of the brake disk 4 or the wheel brake device 1. The re-clamping process is carried out until the electric motor 8 enters the locking mode, and if the required minimum clamping force for the re-clamping process is not achieved at a defined later point in time the re-clamping process is started repeatedly or once more in order to carry out the advantageous cooling and hence to counteract the loss of clamping force.

Because the clamping force F is already at a certain level, an increase of the clamping force only takes place at a point in time t7. Said point in time is regarded as a turning point.

Figure 5:
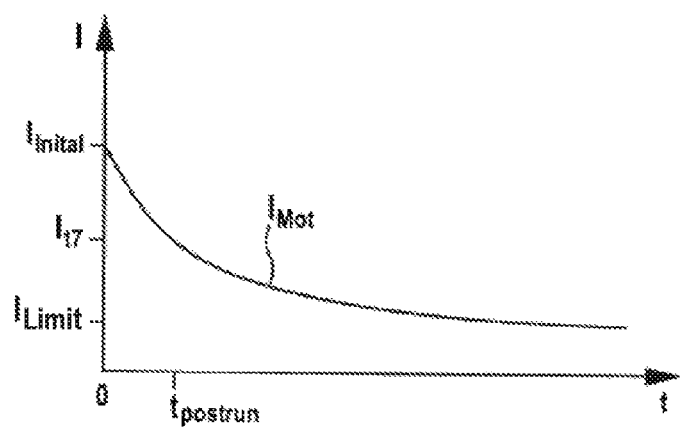
FIG. 5 shows a current profile of an electromotive actuator of the braking device.

FIG. 5 shows the current profile against time t for this. A current $I_{t7}$ represents the temperature at the point in time of the re-clamping. The cooling of the brake disk can be concluded from the difference of the two currents $I_{Initial} - I_{t7}$. The time $t_{postrun}$ between the initial locking and the current re-clamping process, i.e. in particular between t4 and t6, is known. The time constant τ can be determined by means of the following relationship:

$$I_{t7} = (I_{Initial} - I_{Limit}) * e^{-tpostrun/\tau} + I_{Initial} \qquad (11)$$

The values $I_{Initial(t4)}$ and $I_{t7}$ are known. The limit value $I_{Limit}$, which is set following cooling of any duration, can be determined therefrom using equation (11). At the same time this represents the possible loss of clamping force $F_{Rest}$.

Figure 6:
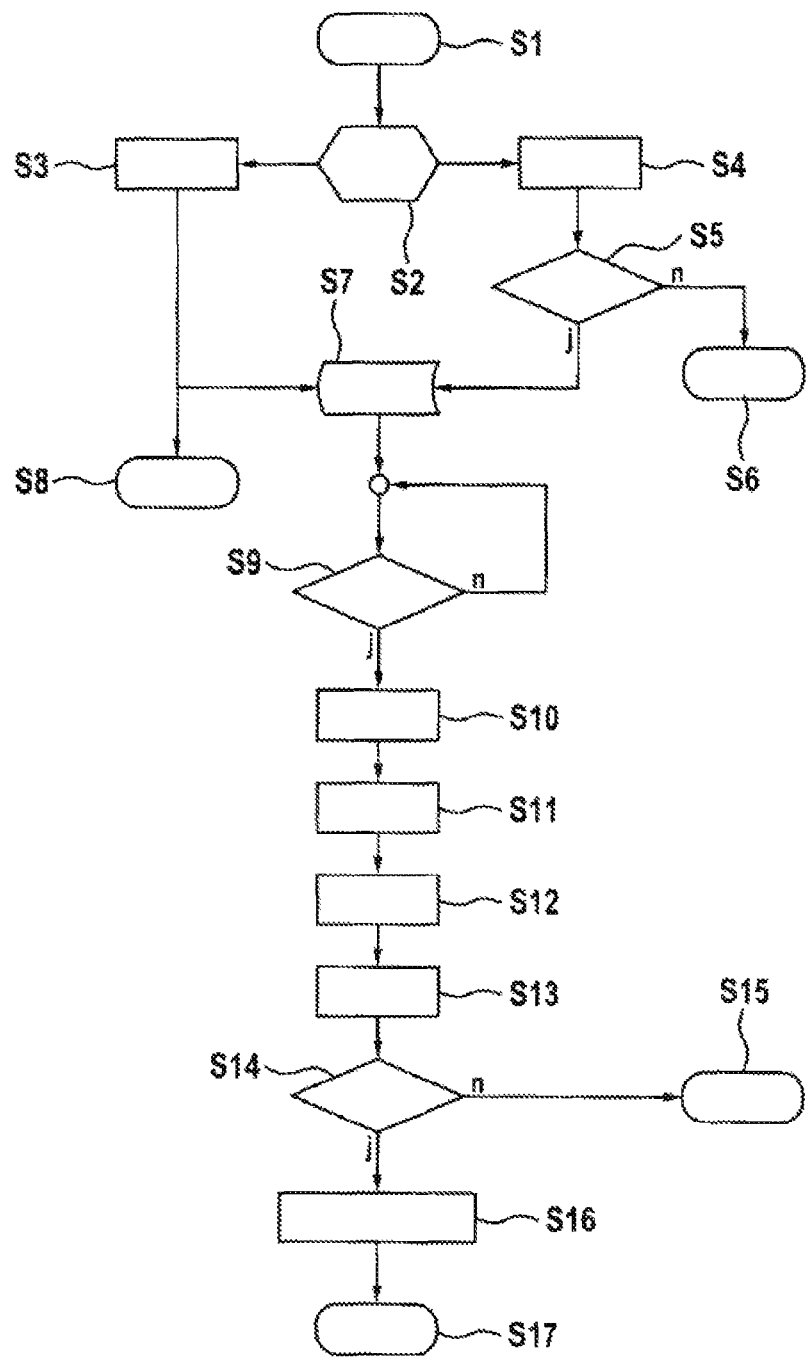
FIG. 6 shows a summary of a method for operating the braking device in a flow chart.

FIG. 6 shows the previously described method summarized in a flow chart. In a first step S1 the electric motor 8 is activated in order to clamp the braking device 1. In a step S2 for this purpose, on the one hand the electric motor 8 is activated for the clamping operation in the step S3, and on the other hand the process for detecting the brake disk temperature is started in a step S4. A detected brake disk temperature is compared with a threshold value $T_{Limit}$ in a step S5. If the brake disk temperature and T lies below the threshold value (n), then the process is terminated in a step S6. If the determined brake disk temperature lies above the threshold value (j), then in a step S7 the initial current $I_{Initial}$ is stored at the point in time t4, which is measured on terminating the clamping process in step S8.

In a subsequent step S9, it is decided whether a re-clamping process should be carried out. For this purpose, a check is first made as to whether a minimum time period following the termination of the initial clamping process has elapsed. If this is the case (j), then the electric motor 8 is activated again in a step S10 in order to increase the clamping force F or to displace the actuator element 10 to increase the clamping force. During this the current $I_{Mot}$ is measured at the turning point (t7) in a step S11, and in a subsequent step S12 the threshold value $I_{Limit}$ is calculated. Then a clamping force limit value $F_{Limit}$ is determined in a step S13 and is compared with a target clamping force in a step S14. If the clamping force limit value exceeds the target clamping force, then the process is terminated in step S15. If the limit value is below the target limit value, then the activation of the electric motor 8 is maintained until a target minimum clamping force is set (step S16), being in particular the sum of the initial clamping force at the point in time t7 and the difference of the target clamping force and the clamping force limit Once the minimum clamping force has been reached, the method is terminated in a step S17.

FIG. 4 shows, as already mentioned, the signal profile of the actuator 7 when locking or clamping the parking brake or the braking device 1. The current between the times t1 and t3 is referred to as the idling current $I_{Idling}$. Said current is in general constant and is determined by the idling friction of the actuator 7. The following applies to this:

$$I_{Idling} = \text{Average}(I, t1 \text{ to } t3) \tag{12}$$

Figure 7:
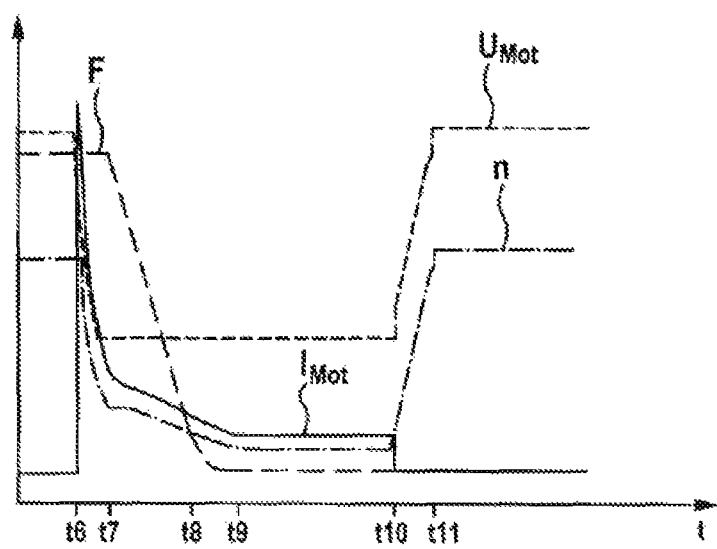
FIG. 7 shows a signal profile during release of the braking device.

The signal profile of the actuator 7 when loosening or releasing is shown in FIG. 7. The idling phase during loosening is the phase between the points in time t9 and t10. The idling current can be determined in the same way as when locking, namely as the average value between said times.

The idling current $I_{Idling}$ is, as already described, dependent on the idling frictional torque. Mechanical component properties are the cause thereof. The temperature dependency of the idling current occurs particularly pronouncedly for parking brake devices comprising a belt drive made of an elastomer. Said dependencies are however to be observed with actuator gearboxes of other designs, such as for example in the present case. In the following equation (13), the simplest possibility of temperature dependency is shown. It is a linear formula. However, higher order formulas are also possible:

$$I_{Idling}(T) = I_{Idling}(25° \text{ C.}) + k*\{25° \text{ C.} - T\} \tag{13}$$

The equation (13) contains two constants: the idling current $I_{Idling}$ at room temperature (25° C.) and the proportionality factor k with the units Ampere/Kelvin. The proportionality factor k is preferably determined using empirical measurements on a plurality of wheel brake devices. The idling current $I_{Idling}(25° \text{ C.})$ at room temperature is individually determined for each wheel brake device, for example during the end check. The equation (13) only has to be changed according to the temperature T in order to obtain the temperature for a measured idling current:

$$T = 25° \text{ C.} - (I_{Idling(measured)} - I_{Idling}(25° \text{ C.}))/k \tag{14}$$

The idling current $I_{Idling}$ is now measured during each application, regardless of whether locking or releasing is involved, and the temperature T is determined using the equation (14). The temperature T is now forwarded to the brake disk temperature model and the clamping force algorithm (force estimator). The brake disk temperature model uses the determined temperature T, as already described, to verify the internally calculated brake disk temperature. The force estimation algorithm uses the temperature T in a compensation function $F=f(T)$ for more accurate assignment of the clamping force. Thus the current profile and a comparison variable, i.e. the idling current at 25° C., are used to conclude the brake disk temperature of the brake disk 4 when clamping and releasing. In particular, the process for the method described in FIG. 6 is used to verify the brake disk temperature. An available "clamping force strategy" or a suitable clamping force algorithm uses the additional input variable T, in particular during the clamping process, in order to set a target clamping force, in particular also taking into account possible clamping force losses.

What is claimed is:

1. A method for operating a braking device of a vehicle, the braking device including an electromotive actuator that displaces an actuator element either into a clamping position for subjecting a brake disk to a clamping force or into a release position for releasing the brake disk, the method comprising:
   determining a brake disk temperature
   converting a pressure value of a hydraulic or pneumatic actuator of the braking device that is detected at the point in time into an equivalent current,
   wherein a sum of a stored motor current and the equivalent current gives an actuator current value, and
   wherein the brake disk temperature is determined depending on the actuator current value; and
   activating the actuator depending on the determined brake disk temperature using a control unit of the braking device.

2. The method according to claim 1, further comprising:
   detecting a motor current during displacement of the actuator element into the clamping position,
   wherein the motor current that is detected when a termination of the displacement is stored as the actuator current value.

3. The method according to claim 1, further comprising:
   concluding a subsequent loss of brake force depending on the actuator current value.

4. The method according to claim 1, further comprising:
   comparing the brake disk temperature that is determined with a threshold value; and
   initiating re-clamping of the wheel brake device upon the determined brake disk temperature exceeding the threshold value.

5. The method according to claim 1, wherein a re-clamping is performed until a clamping force is reached that exceeds a threshold value even in the event of a subsequent loss of clamping force.

6. The method according to claim 1, wherein the current value is determined in an idling phase of the actuator while displacing the actuator element.

7. The method according to claim 1, wherein a temperature is determined depending on the current value and a reference current value in an idling mode and the determined temperature is used for the determination or verification of the brake disk temperature.

8. An apparatus for operating a braking device of a vehicle, wherein the braking device comprises an electromotive actuator that displaces an actuator element either into a clamping position for subjecting a brake disk to a clamping force or into a release position for releasing the brake disk, the apparatus comprising:
   a control unit configured to (i) determine a brake disk temperature, (ii) convert a pressure value of a hydraulic or pneumatic actuator of the braking device that is detected at the point in time into an equivalent current, and (iii) activate the actuator depending on the determined brake disk temperature,
   wherein the brake disk temperature is determined depending on at least one actuator current value, and
   wherein a sum of a stored motor current and the equivalent current gives an actuator current value.

9. A braking device for a vehicle, comprising:
- an electromotive actuator configured to displace an actuator element either into a clamping position for subjecting a brake disk to a clamping force or into a release position for releasing the brake disk; and
- an apparatus including a control unit configured to determine a brake disk temperature in order to activate the actuator depending on the determined brake disk temperature and configured to convert a pressure value of a hydraulic or pneumatic actuator of the braking device that is detected at the point in time into an equivalent current,
- wherein the brake disk temperature is determined depending on at least one actuator current value, and
- wherein a sum of a stored motor current and the equivalent current gives an actuator current value.

10. The method of claim 1, wherein the braking device is adapted to be a parking brake device.

11. The apparatus of claim 8, wherein the braking device is adapted to be a parking brake device.

12. The braking device of claim 9, wherein the braking device is a parking brake device for a motor vehicle.

13. A method for operating a braking device of a vehicle, the braking device including an electromotive actuator that displaces an actuator element either into a clamping position for subjecting a brake disk to a clamping force or into a release position for releasing the brake disk, the method comprising:
- determining a brake disk temperature in order to activate the actuator depending on the determined brake disk temperature using a control unit of the braking device;
- comparing the brake disk temperature that is determined with a threshold value; and initiating re-clamping of the wheel brake device upon the determined brake disk temperature exceeding the threshold value; and
- converting a pressure value of a hydraulic or pneumatic actuator of the braking device that is detected at the point in time into an equivalent current,
- wherein a sum of a stored motor current and the equivalent current gives an actuator current value, and
- wherein the brake disk temperature is determined depending on the actuator current value.

\* \* \* \* \*

UNITED STATES PATENT AND TRADEMARK OFFICE
CERTIFICATE OF CORRECTION

PATENT NO. : 9,701,290 B2
APPLICATION NO. : 14/975806
DATED : July 11, 2017
INVENTOR(S) : Baehrle-Miller et al.

It is certified that error appears in the above-identified patent and that said Letters Patent is hereby corrected as shown below:

In Column 8, Line 14, Line 7 of Claim 1 should read:
determining a brake disk temperature;

Signed and Sealed this
Seventeenth Day of October, 2017

Joseph Matal
*Performing the Functions and Duties of the*
*Under Secretary of Commerce for Intellectual Property and*
*Director of the United States Patent and Trademark Office*